Dec. 25, 1962

A. ALLEN ET AL 3,070,716

POSITIONING MOTORS

Filed May 26, 1958

INVENTORS
ALBERT ALLEN
WILFRED H. HOWE
HOEL L. BOWDITCH
BY Curtis, Morris & Safford
ATTORNEYS:

Dec. 25, 1962  A. ALLEN ET AL  3,070,716
POSITIONING MOTORS
Filed May 26, 1958  2 Sheets-Sheet 2
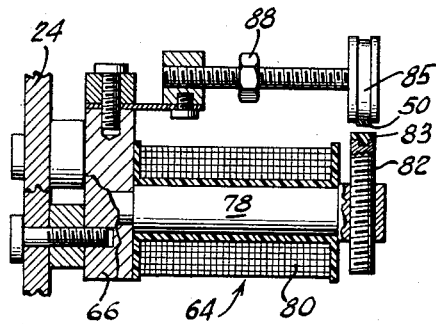
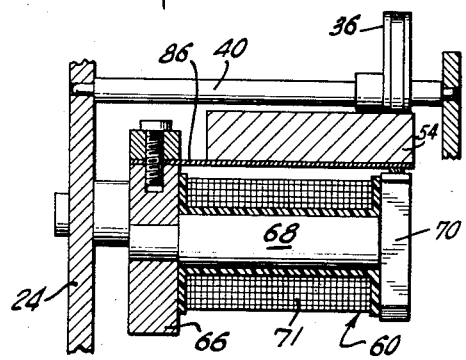
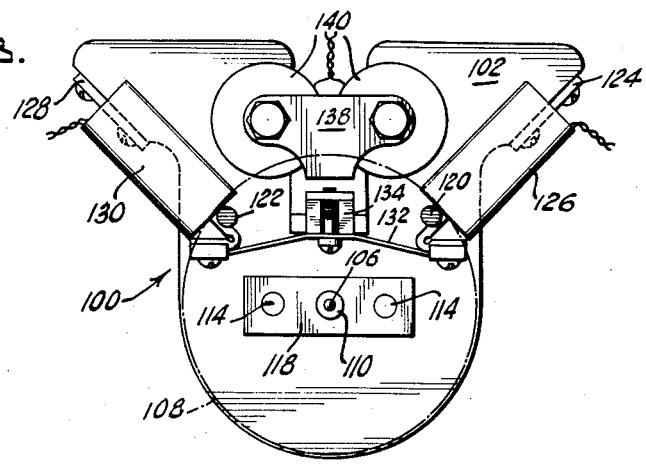
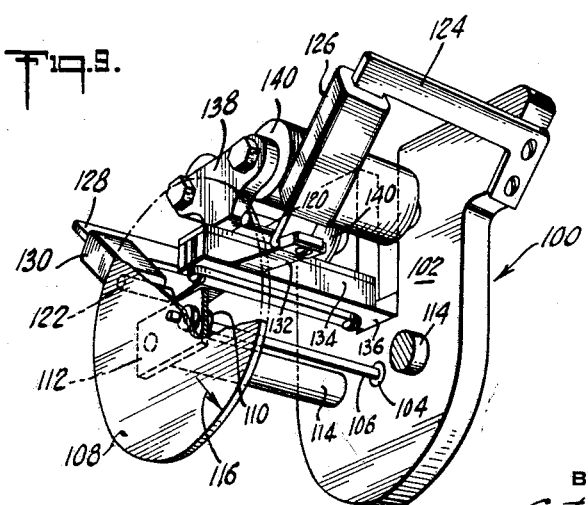
INVENTORS
ALBERT ALLEN
WILFRED H. HOWE
BY HOEL L. BOWDITCH
Curtis, Morris & Safford
ATTORNEYS 3,070,716
POSITIONING MOTORS
Albert Allen and Wilfred H. Howe, Sharon, and Hoel L. Bowditch, Foxboro, Mass., assignors to The Foxboro Company, Foxboro, Mass., a corporation of Massachusetts
Filed May 26, 1958, Ser. No. 737,665
8 Claims. (Cl. 310—22)

This invention relates to electric motors for positioning such elements as the pen of a recording instrument, the re-balancing member of an automatic measuring circuit, and so forth.

An object of the invention is to provide electric positioning motors which are simple and inexpensive to manufacture, do not require critical tolerances, but which are very precise and reliable in operation.

Another object is to improve the efficiency of such a motor so that it can be controlled by relatively small amounts of power.

These and other objects will in part be understood from and in part pointed out in the description given hereinafter.

Modern industry uses a wide variety of apparatus to automatically control and record such conditions as temperature, pressure, rate-of-flow, and the like. In such apparatus, the mechanical re-balancing of a condition sensing element, the closing or opening of a valve, or the movement of a pen across a recording chart are all executed by a positioning motor of one kind or another. To meet the high standards of perfection required in this service, a positioning motor must be free of harmful bearing drag or play, and it must respond easily to relatively weak control signals. It must also be able to quickly reach a position which accurately accords with any given control signal, then stop without overshoot or hunting, and thereafter maintain its position until directed to a new one. Finally, because such a motor is in one sense the heart of the instrument or apparatus and is frequently located in cramped or inaccessible places, it must operate unattended for years with absolute reliability, and yet it must be small in size. These requirements have, in the past, been very difficult to fulfill and many motors previously developed have been too expensive or else not sufficiently reliable or precise in operation.

The present invention makes possible a positioning motor having all the desirable features of simplicity, low cost, reliability and preciseness in operation, together with improved running efficiency. In accordance with the invention there is provided a motor which can be energized with standard 60-cycle alternating current and very little power. In one specific motor illustrated herein, the driven element, somewhat analogous to the armature in a conventional electric motor, is a thin flexible band stretched around two spaced pulleys to form two parallel sections which are held taut by a spring connecting the ends of the band. Acting on the mid-portion of one section of the band is a clamping and flexing mechanism, energized by simple electromagnets, which by repeatedly bowing a short length of the section serves to "inch" the band along in steps, in either direction as desired, in much the way a caterpillar creeps along the ground. To augment the band bowing action of this flexing mechanism, it is adjusted to mechanical resonance at the frequency of the current energizing it. Thus the amplitude of its lateral motion and the length of each step of the band are maximized. A second motor described herein and also incorporating features of the invention is similar in structure to the first but instead of utilizing an endless band the second motor employs a short ribbon-like strip the central portion of which is repeatedly bowed and the ends of which are alternately clamped and unclamped against a rotatable disk to impart step-by-step rotation to the disk. Here, the strip flexing mechanism along with the strip itself and the elements attached to it are adjusted to resonance to obtain maximum driving efficiency.

A better understanding of the invention and a fuller appreciation of its many advantages will best be gained from a study of the following description given in connection with the accompanying drawings wherein:

FIGURE 1 is a perspective view partly broken away of a strip chart recorder including a positioning motor embodying features of the invention;

FIGURES 2, 3 and 4 indicate the position (in exaggerated scale) of the motor elements at successive times;

FIGURE 6 is an enlarged section view taken as indicated by lines 6—6 in FIGURE 1;

FIGURE 7 is a similar section view taken as indicated by lines 7—7 in FIGURE 1;

FIGURE 8 is a plan view of another motor embodying features of the invention; and FIGURE 9 is a perspective view of the motor in FIGURE 8.

Figure 1:
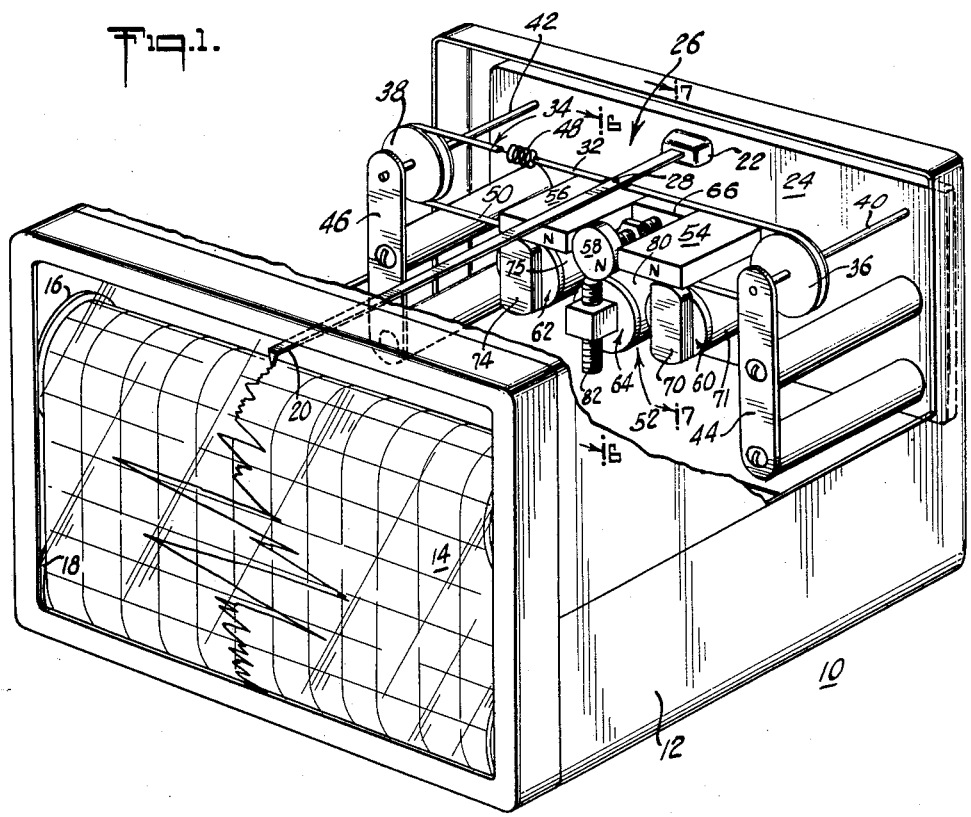

The chart recorder 10 shown in FIGURE 1 includes a housing 12 having a front window behind which is positioned a chart 14 mounted on two rollers 16 and 18 and driven slowly downward by a clock motor (not shown). In contact with the upper portion of the chart, and adapted to travel in either direction across it, is an indicator pen 20 which records, in accordance with its lateral position on the chart, a variable condition such as temperature. The rear end of this pen carries a counterweight 22 which is closely in front of the base plate 24 of an electric motor generally indicated at 26. Just forward of this counterweight the pen is attached at point 28 to the upper section 32 of a band 34.

The band 34 is a flexible ribbon of metal, and is stretched around and between the two idler pulleys 36 and 38. The latter in turn are rotatably mounted on the axles 40 and 42 which are supported by the brackets 44 and 46 secured to the base plate 24. The band is kept taut by means of a tension spring 48 inserted in the top section 32. As will appear, this band can be driven in either direction and in so moving will carry the indicating pen 20 transversely across the chart 14. The position of the band, and with it the pen, is precisely controlled in the way explained below.

Band 34 has a lower section 50 which is engaged on one side by a clamping and flexing mechanism generally indicated at 52. This mechanism includes the two laterally movable clamping bars 54 and 56, which are permanently magnetized and between which is mounted a vertically movable bowing arm 58 formed of soft magnetic material. Positioned adjacent the lower side of the band section 50 are three electromagnets 60, 62 and 64 which cooperate with the clamping bars 54 and 56 and the bowing arm 58 respectively.

These electromagnets 60, 62 and 64 are mounted along with the clamping bars 54 and 56 and the bowing arm 58, on a support plate 66 formed of soft magnetic material, and which in turn is fastened (see also FIGURE 7) to the base plate 24. The right-hand electromagnet 60, seen in FIGURE 7, includes a cylindrical magnetic core 68 the bottom of which is anchored in the support plate 66 and the top of which carries a pole piece 70. Surrounding this core is a multi-turn coil 71 which is adapted to be supplied with alternating current to generate a magnetic flux in the core and pole piece. The left-hand electromagnet 62 similarly includes a magnetic core (not shown) fastened at one end to the support plate 66 with a pole-piece 74 at the other end, and is surrounded by a coil 75. The center electromagnet, seen in FIGURE 6, has a magnetic core 78 and a surrounding coil 80. The outer or right end of core 78 is provided with an adjustable pole piece 82 in the form of a screw which can be set to the proper lateral position relative to the band section 50 for the desired amount of bowing of the band. The forward end of this adjustable pole piece is cushioned by a plastic pad 83, of nylon for example, to minimize wear and to provide an air gap for the magnetic flux to and from the bowing arm 58. The outer or right end of the bowing arm carries a circular pole piece having a peripheral groove 85 into which the band section 50 can fit.

The lower ends of each of the clamping bars 54 and 56, and of bowing arm 58, are hinged to support plate 66 so that their top ends are swingable laterally (with respect to the band section 50) toward and away from a respective one of pole pieces 70, 74 and 82. As seen in FIGURE 7, clamping bar 54 is hinged to support plate 66 by a thin flat flexure 86 the lower end of which is bolted to support plate 66 and which along its upper portion is brazed to the inner face of clamping bar 54. Clamping bar 56 is hinged in the same way by a flexure (not shown). Similarly, as seen in FIGURE 6, the lower end of the bowing arm 58 is joined by a flexure 87 to support plate 66. Each of these hinge flexures is of soft magnetic material.

The bowing arm 58 is threaded along its length and engaged by a closely fitting nut 88. By adjusting this nut up or down, the resonant or natural frequency of vibration back and forth of the bowing arm can be made to coincide with the frequency of the current energizing the motor. Thus, as indicated in FIGURE 5, by adjusting this resonant frequency from $f_1$ to $f_0$, the amplitude of vibration can be maximized. As will appear in connection with FIGURES 2 through 4, this will increase the length of each step imparted to the driven band though it will not cause unwanted overshoot when the band reaches a desired position.

The permanent magnets of the clamping bars 54 and 56 have their like poles extending in the same directions. In FIGURE 1, the movable ends of these bars are shown as north (N) poles and their hinged ends adjacent support plate 66 are south (S) poles. Bowing arm 58, by virtue of its proximity to clamping bars 54 and 56 is north magnetic at its movable end. Accordingly, each of these magnetized members establishes lines of magnetic flux which extend across the movable or upper ends of bars 54 and 56 and arm 58 to the corresponding pole pieces 70, 74 and 82 of the three electromagnets, downward through the cores, and then within plate 66 back to the lower ends of the clamping bars and upward.

When no current is flowing in the coils of the electromagnets, the clamping bars and bowing arm, because of the permanent magnetic flux, will be drawn against band section 50 and thus hold it against the stationary pole pieces of the electromagnets. On the other hand, when an alternating current is applied by any one of the electromagnets there is generated an alternating magnetic flux and the opposing clamping bar or bowing arm will cyclicly be repelled from the electromagnet thus releasing its pressure against band section 50. By operating the clamping and releasing actions of the clamping bars 54 and 56 and bowing arm 58 in proper phases relative to each other, band section 50 can be inched along to either the right or the left.

Figure 2:
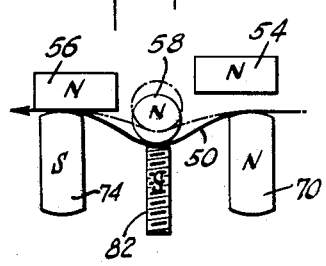
Figure 3:
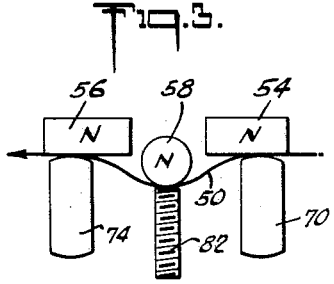
Figure 4:
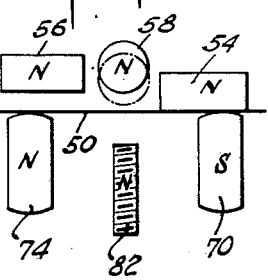
Figure 5:
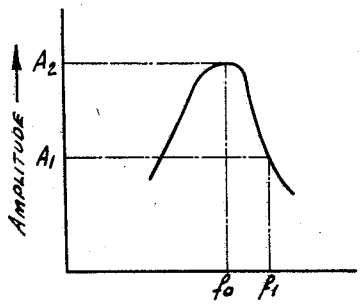
FIGURE 5 is a graph representing the amplitude of motion of an element of the motor as a function of frequency in the vicinity of the resonant frequency of the element.

FIGURES 2, 3 and 4 illustrate the sequential operation of the clamping bars and bowing arm as they act in inching band section 50 to the left. To give such leftward movement of the band, coils 71, 75 and 80 (not shown in these figures) are energized so that the alternating fluxes induced in pole pieces 74 and 82 are in phase with each other and out of phase with the flux in pole piece 70. At the instant of time represented by FIGURE 2 the alternating flux in pole piece 70 is inducing a north (N) pole which repels clamping bar 54 while the fluxes in pole piece 74 and pole piece 82 are inducing south (S) poles which attract clamping bar 56 and bowing arm 58, respectively. In this position, band section 50 is bowed, its right end having been drawn to the left by the small amount required in bowing it. The larger amplitude of lateral vibration of bowing arm 58 when it is resonant is indicated by the solid line positions in FIGURES 2 and 4 whereas when non-resonant it has a smaller amplitude as indicated by the dotted lines.

A quarter-cycle later, the parts occupy the position shown in FIGURE 3. Now, band section 50 is held by both clamping bars 56 and 54, the permanent magnetism of the latter two pulling them against pole pieces 70 and 74 which at this instant are not magnetized by alternating flux. Another quarter cycle later, as shown in FIGURE 4, clamping bar 56 and the bowing arm will have moved away from pole pieces 74 and 82 which have become in effect north poles, and the left-hand end of band section 50 will have moved incrementally to the left under the tension of spring 48 and of the straightening force of the band itself, the right-hand end of the band section being held stationary between clamping bar 54 and pole piece 70.

This mode of operation continues until section 50 of band 34 reaches the position desired whereupon the current to coil 80 is turned off and the motor stops. It is not necessary to de-energize coils 71 and 75 since they merely actuate the clamping bars, no motion being imparted to the band unless coil 80 is energized. To reverse the direction of travel of the band, coil 80 is energized in phase with coil 71. Even though bowing arm 58 vibrates laterally at its resonant frequency, which substantially increases the efficiency of the motor, there is no difficulty with overshoot of the band upon reaching a desired position. In other, different types of motors, making moving elements of the motor mechanically resonant greatly increased this difficulty.

FIGURES 8 and 9 show a second motor 100 also embodying features of the invention. This motor includes a base plate 102 in the center of which is journalled at 104 the lower end of an axle 106. The upper end of this axle flexurally carries a flat disc 108 of magnetic material which is rotatable with the axle in a plane parallel to the base. Rotatably supporting the upper end of axle 106 just below disc 108 is a bearing 110 which is carried by a bar 112 mounted between the upper ends of the posts 114 fixed to base 102. As will appear, disc 108 can be rotated in steps in one direction or the other for any desired distance and its mounting on axle 106 is such that the rim of the disc can be deflected downward slightly. A pointer or an index mark carried by disc 108 (such as indicated by arrow 116) can be used in connection with a fixed chart, for example, so that the angular position of disc 108 will indicate a quantity or condition being measured by control apparatus (not shown) used in conjunction with the motor.

The stepwise rotation of disc 108 is accomplished as follows. Positioned immediately beneath the disclose to its rim are two pins 120 and 122 which are of magnetic material and are mounted to swing back and forth parallel to the plane of the disc and at the same time alternately to be clamped and unclamped to the disc to inch it either clockwise or counter-clockwise, depending upon the phase of clamping and unclamping relative to the swinging movement.

Pin 120 is mounted at right angles to and on the outer end of an L-shaped spring arm 124 formed of magnetic material and the lower end of which is fixed to base 102. Surrounding the outer end of arm 124 is a winding 126 which is adapted to be energized by a suitable alternating current to magnetically clamp and unclamp pin 120 against disc 108 by deflecting the disc downward and upward against and away from the pin. Pin 122 is similarly mounted on the outer end of an L-shaped spring arm 128 fixed to base 102 and carrying a winding 130 which can be energized 180° out of phase with winding 126.

Connecting the outer ends of L-arms 124 and 128 is a thin ribbon spring or flexure 132 which is generally parallel to disc 108 and which at its center is attached to the upper end of a bar-shaped permanent magnet 134. The lower end of this magnet is hinged to base 102 by a flexure 136, the upper end of the magnet being swingable back and forth transversely along with ribbon spring 132 under the action of alternating magnetic flux generated in a stationary pole piece 138. This pole piece is fixed on the upper ends of two parallel magnetic cores (not shown) mounted on base 102 and surrounded by a a parallel-connected pair of coils 140.

These coils 140 are adapted to be energized by an alternating current of the same frequency as that which energized windings 126 and 128 and in phase with one or the other of these windings. When coils 140 are energized, the upper end of magnet 134 swings back and forth toward and away from pole piece 138 and in so doing laterally flexes ribbon spring 132. This causes the ends of L-arms 124 and 128 and clamping pins 120 and 122 to swing parallel to the disc and generally tangentially relative to its rim. Now, by holding disc 108 clamped to one pin while it and the other pin swing together, and then reversing the clamping of the pins when they swing apart, the disc will be rotated step-by-step. To increase the size of each step, the amplitude of swinging of pins 120 and 122 is maximized by making the driving mechanism for the pins resonant at the frequency at which coils 140 are energized. That is, the moving mass comprising the pins, L-arms, windings, ribbon spring, and magnet, is so proportioned relative to the spring constants of the L-arms and the ribbon spring that the overall natural resonant frequency is equal to the frequency at which the magnet is driven by the coils 140. Though these parts are mechanically resonant, as with motor 10 there is no difficulty with overshoot. The permanent magnetic flux provided by magnet 134 serves for the same general purpose as the flux provided by the clamping bars 54 and 56 in motor 10.

Motors generally like the motors described herein are described in detail in co-pending applications U.S. Serial No. 737,663, filed May 26, 1958, and U.S. Serial No. 737,664, filed May 26, 1958.

The above description of the invention is intended in illustration and not in limitation thereof. Various changes may occur to those skilled in the art and these may be made without departing from the spirit or scope of the invention as set forth.

We claim:

1. An improved motor wherein step-by-step motion is imparted to a movable element so that it can be moved quickly but stopped without overshoot, said motor comprising a plate adapted to drive said element, an elongated member, first and second clamp means carried at spaced points on said elongated member to alternately clamp it to and unclamp it from said plate, and third means acting simultaneously with said first and second means for alternately increasing and decreasing the distance between said points as measured along said plate, said member and said first, second and third means being mechanically resonant at the frequency of operation of said means.

2. An improved efficiency motor comprising an elongated element, a plate member, said member and said element being movable relatively past each other, first means to alternately clamp and unclamp said element to said member at spaced points, and second means acting in synchronism with said first means for alternately physically stressing and unstressing the portion of said element between said points, said second means being operated at the same frequency as the resonant mechanical frequency of the parts involved to provide maximum step-by-step motion of said element relative to said plate member whereby said element and said member can be driven quickly stepwise relative to each other in steps of maximum length to a desired position and then stopped without overshoot.

3. A positioning motor for precise control of instruments and the like, said motor having improved efficiency and comprising a generally straight strip of relatively unstretchable but laterally deflectable material, a clamping and deflecting mechanism for sequentially holding one end of said strip, deflecting the strip laterally between said one end and its other end, and then clamping said other end and releasing said one end to allow said strip to be moved incrementally with respect to said mechanism, said mechanism including first and second spaced clamping means acting at respective ends of said strip, a deflecting means offset from said clamping means for laterally deflecting said strip, said deflecting means being mechanically resonant at the frequency of operation of said clamping means, and means to energize said clamping means out of phase with each other and to energize said deflecting means in phase with either one of said clamping means.

4. The motor as in claim 3 wherein said deflecting and clamping means include three electromagnets mounted on a magnetic base plate with their ends spaced apart along one side of said strip and with said clamping electromagnets closely adjacent said strip and said bowing electromagnet slightly away from said strip, and three movable members of magnetic material on the other side of said strip, each member being opposite a respective one of said electromagnets and laterally movable against and away from said strip, said member opposite said bowing electromagnet being mechanically resonant at the frequency of operation of said electromagnets, whereby the amplitude of swing of said member is maximized.

5. A push-pull motor whose armature is actuated in incremental steps, said motor comprising a thin member of stiff resilient material stretched along a line and having a clamping member on each end, bowing means for laterally flexing said thin member, a movable element adapted to be driven by said thin member, and means to energize said clamping and bowing members in sequence to alternately bow and straighten said thin member transversely between said clamping members so that step-by-step movement is imparted to said element, said thin member and the member movable with it being laterally mechanically resonant at the frequency of operation of said bowing means.

6. A motor for positioning instruments and the like, said motor comprising a frame, a pair of spaced apart pulleys supported from said frame, a thin metal ribbon stretched around said pulleys and having a tension spring pulling its two ends together to form an endless band, first, second and third electromagnets spaced along one portion of said ribbon generally midway between said pulleys, each electromagnet having an upstanding core fixed to a magnetic portion of said frame and having a coil surrounding said core, the outer ends of said cores having pole pieces laterally extending toward said ribbon, the pole pieces of the first and third electromagnets being closer to said ribbon than the pole piece of said second electromagnet, first, second and third upstanding magnetic members hinged to said frame and extending generally parallel to said electromagnets, the outer ends of said members being opposite respective ones of said pole pieces on the opposite side of said ribbon, means to energize with alternating current said first and third electromagnets out of phase to each other and to energize with alternating current said second electromagnet selectively in phase with either said first or third electromagnet, and adjustment means on said second member for setting its mechanical resonance frequency at the frequency of said alternating current.

7. An improved efficiency motor wherein step-by-step motion is imparted to a movable element which can be moved quickly but stopped without overshoot, said motor comprising a movable element whose working length can be lengthened or shortened, means alternately clamping and unclamping said element at each of two spaced points, driving means operable in synchronism with said clamping and unclamping means to alternately increase and decrease the working length of said element at the resonant frequency of said driving means, and means to energize said clamping means at one of said points out of phase with the other point and to energize said driving means selectively in phase with said clamping means at either of said points.

8. An improved efficiency motor wherein step-by-step motion is imparted to a movable element which can be moved quickly but stopped without overshoot, said motor comprising a movable element, means alternately clamping and unclamping said element at each of two spaced points, driving means operable in synchronism with said clamping and unclamping means to alternately increase and decrease the relative proportion of said element between said points at the resonant frequency of said driving means, and means to energize said clamping means at one of said points out of phase with the other point and to energize said driving means selectively in phase with said clamping means at one of said points.

References Cited in the file of this patent
UNITED STATES PATENTS

| | | |
|---|---|---|
| 1,396,337 | McDonald | Nov. 8, 1921 |
| 1,941,597 | Cavagnaro | Jan. 2, 1934 |
| 2,646,518 | Thompson | July 21, 1953 |